June 21, 1938.   G. R. DEMPSTER   2,121,121
TRANSPORTING AND DUMPING VEHICLE
Filed Jan. 16, 1937   3 Sheets-Sheet 1

Inventor
George R. Dempster
By Cameron, Kerkam + Sutton
Attorneys

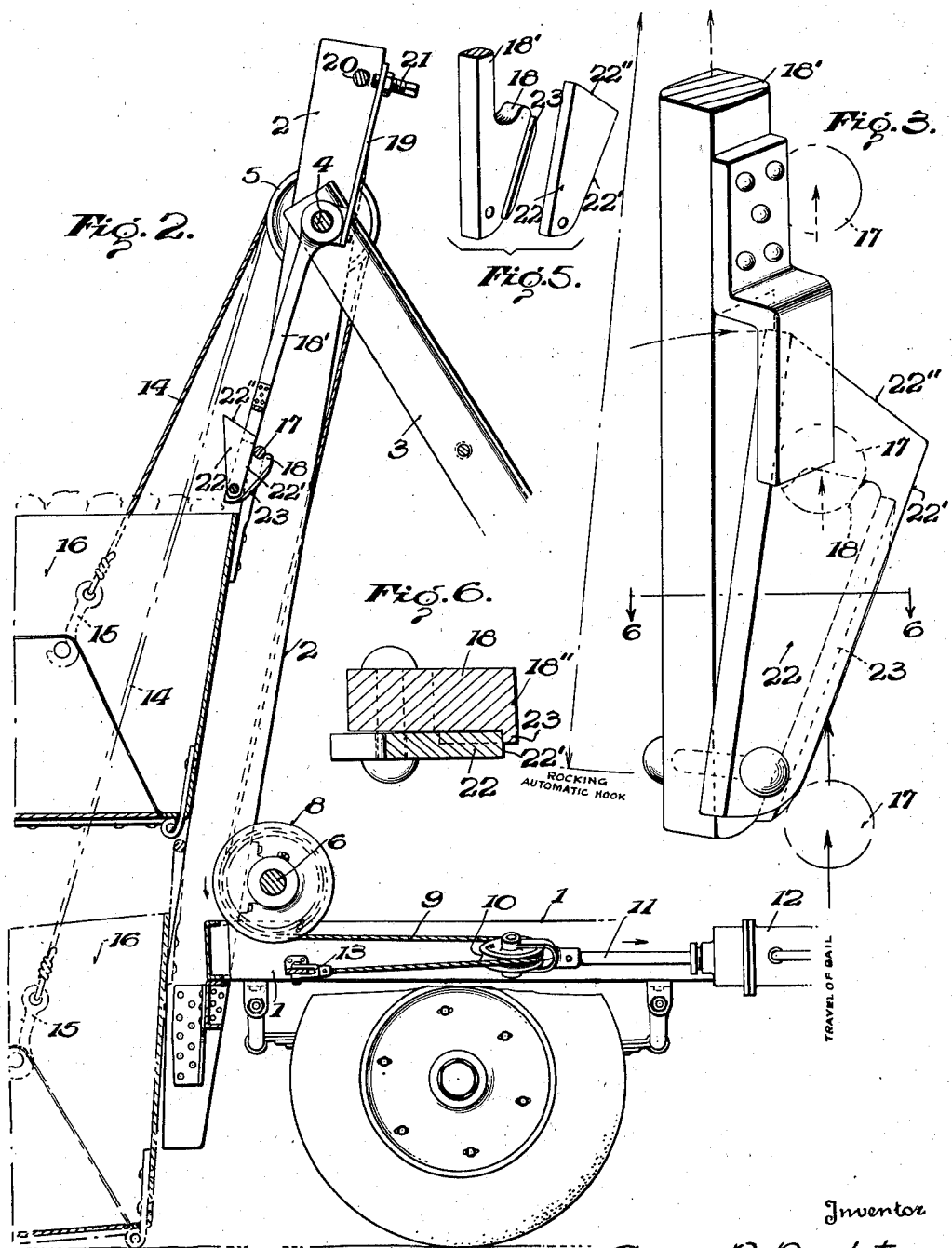

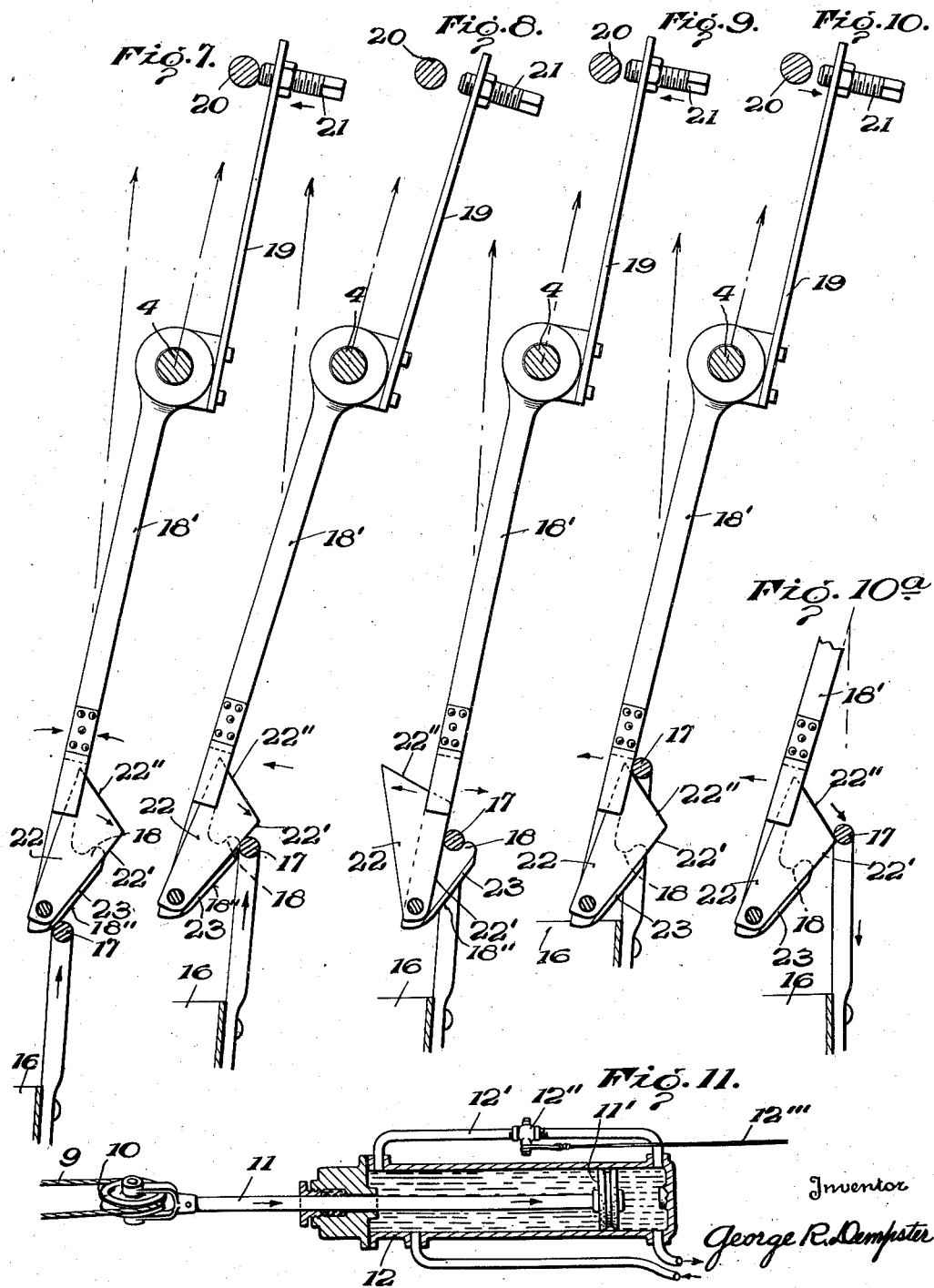

Patented June 21, 1938

2,121,121

UNITED STATES PATENT OFFICE 2,121,121

TRANSPORTING AND DUMPING VEHICLE

George R. Dempster, Knoxville, Tenn.

Application January 16, 1937, Serial No. 120,993

6 Claims. (Cl. 214—75)

This invention relates to transporting and dumping vehicles of the general character set forth in pending applications Serial No. 5,145, now Patent No. 2,069,697, and Serial No. 117,387, and has for its object to improve the construction and operation of the same, whereby the cost of construction and the cost of operation may be decreased, and the general operation improved.

The inventive ideas involved are capable of receiving a variety of mechanical expressions, one of which, for the purpose of illustrating the invention, is shown in the accompanying drawings, but it is to be expressly understood that such drawings are for the purpose of illustration only and are not designed to define the limits of the invention, reference being had to the appended claims for this purpose.

In said drawings—

Fig. 2 is a detailed sectional view in side elevation of part of the structure showing the operation of the automatic bucket-sustaining hook employed;

Fig. 3 is an enlarged perspective view of said hook;

Fig. 5 is a broken perspective detail of the hook;

Fig. 6 is a cross sectional view on the line 6—6 of Fig. 3;

Figs. 7, 8, 9, 10 and 10a are side elevations showing the operation of the automatic hook; and Fig. 11 is a sectional side elevation of the operating cylinder and connected parts.

Figure 1:
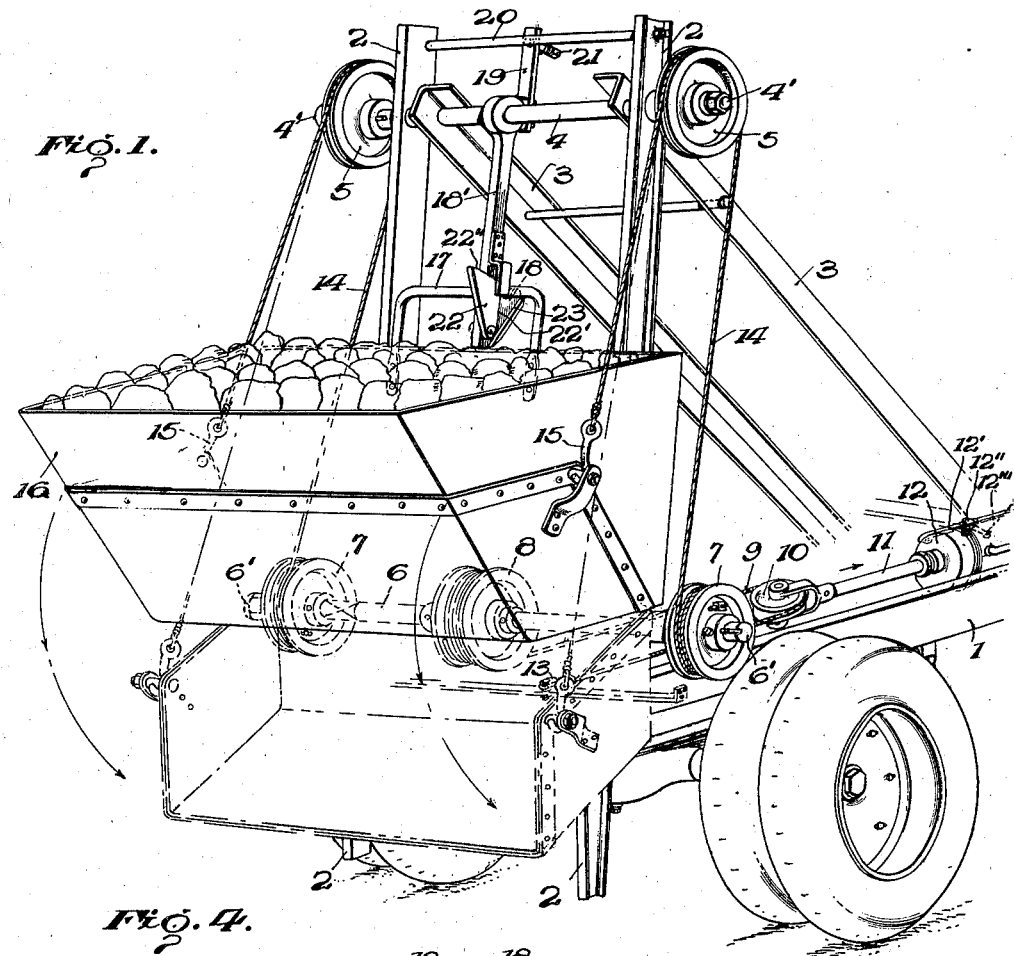
Fig. 1 is a perspective view of one form which the invention may assume.

Referring to the drawings in which like reference numerals indicate like parts throughout the several views, 1 is a framework or any suitable vehicle, here shown as part of the frame of an automotive truck and 2, 2 are two forwardly inclined, upwardly extending bars which are preferably parallel and usually are composed of angle bars. These bars are suitably secured at their lower portion to the vehicle and preferably to the side bars 1 of the frame of the vehicle. 3, 3 are suitable braces, preferably also of angle bars, having their lower ends secured in any suitable way to the framework or other parts of the vehicle and extending upward and rearward to the bars 2, 2. Preferably these braces 3, 3 extend one on the inside of each of the upright bars 2, 2 and a stationary rod 4 is passed through the upright bars 2, 2 and the braces 3, 3, as shown in Fig. 1, with the ends 4' of said rod 4 extending well outside of the bars 2, 2. On these projecting end portions, 4', 4', sheaves 5, 5 are journaled. Mounted on the rear end of the frame of the vehicle, preferably just above said rear end, is a revoluble shaft 6. Preferably this shaft is mounted in brackets secured to the lower portion of the bars 2, 2 just above the frame 1. This shaft 6, like the rod 4, extends entirely across the vehicle with its ends 6' (Fig. 1) extending out beyond the bars 2, 2. Keyed to projecting ends of said shaft 6 are drums 7, 7 well outside of the bars 2, 2. The parts are preferably so positioned that the drums 7, 7 are approximately in a vertical line beneath the sheaves 5. Fixed on the shaft 6 is mounted a drum 8 (Fig. 1) around which is wound a cable 9, one end of which cable is secured to the drum, and the cable, after being wound repeatedly around the drum 8, is passed around the sheave 10 on the end of a piston rod 11 connected to a piston 11' in a cylinder 12 (see Figs. 2 and 11). After passing around the sheave 10, the cable is secured at one end, 13, to a suitable part of the rear end of the structure. Wound on the drums 7, 7, are cables 14, 14 which extend upward from said drums and over the sheaves 5. These cables are provided with any suitable means, as hooks, 15, 15 to engage a bucket or other container 16 mounted to travel on the bars 2, 2 as a track or way. It will be noted that the piston rod 11 extends rearward from the cylinder 12 and when the piston rod moves inward (from left to right in Figs. 1 and 2) the drum 8 will be revolved and with it the drums 7, 7, all three of said drums being keyed to the shaft 6, which shaft is mounted to turn in suitable bearings. When the cables 14 are attached to the bucket 16, this inward movement of the piston rod will wind up the cables 14 and elevate the bucket or container 16 into the position shown in full lines in Fig. 1. This is the position which the container 16 occupies during transportation; and it will be noted that the drums 7, 7 are so positioned that oscillation of the container during transportation will in no way interfere with the drums. This container 16 has secured thereto above its center of gravity a rod or bar, here shown as in the form of a bail piece 17, shown as secured to the rear wall of the container and extending somewhat above the top of said wall. This bail piece 17 is of some considerable length, extending longitudinally of the bucket or container 16, and when the container is elevated to the position shown in full lines in Fig. 1, the bail 17 is automatically engaged by an automatic supporting device or catch, here shown as in the form of a hook 18. This hook is mounted on a bar 18' turning on the rod 4 at a point between the bars 2, 2 of the track or way and has an upwardly extending arm 19 engaging a rod 20 extending transversely between the bars 2, 2. This arm 19 has an adjusting screw 21 extending therethrough in position to abut against the rod 20, as shown in Figs. 2, 7 and 9.

Referring now to Figs. 3 and 5 to 10, the hook 18 is shown as formed integrally with the bar 18' and on the lower end thereof, and has a member 22 pivoted thereon, the center of gravity of which member, when the parts are in operating position (Fig. 7), is well toward the same side of the bar 18', as is the hook 18. Being pivoted so as to turn freely on its pivot, this member would fall outward, i. e., from left to right in Figs. 3, 5, 7 and 9, but for the fact that it engages a shoulder 23 on the hook 18 (see Figs. 5, 6 and 8). This is its normal position except when actuated by the bail 17, as hereinafter described. When the bail is out of engagement with the hook, the parts occupy the position shown in Figs. 3 and 7. As the bail moves upward, it engages the upwardly and outwardly inclined face 18" of the hook (Figs. 6 and 8), and swings the hook 18 and with it the bar 18' on the rod 4 without effecting any movement of the member 22 on its pivot until the bail piece reaches the point just above the lip of the hook (see Fig. 8), whereupon the hook swings down under the bail (see Fig. 9). The member 22, however, does not partake of this downward movement of the hook, since it extends well above the lip of the hook, and when the hook swings downward under the bail, the member 22 is held back by the bail in the position shown in Figs. 2 and 9. In this position the hook engages the bail and serves to support the container in its elevated position, as shown in full lines in Figs. 1 and 2, and with the member 22 resting against the bail 17. With the container thus supported it is in position for transportation.

When the container is in elevated position the piston 11' and the piston rod 11 are in the position shown in Fig. 11. By permitting the piston and piston rod to move outward (from right to left in Fig. 2), the weight of the bottom of the container, together with the load therein, causes the bottom of the container to drop into the position shown in dotted line in Fig. 1 and dump the load. This being accomplished, the piston rod 11 is again moved inward from the left to right in Figs. 2 and 11, and the parts operated as above described to wind up on the cables 14. This serves to close the bottom of the container, but leaves the latter supported by the hook 18, and it is thus transported to be refilled. When it is desired to deposit the container on the ground, the container, and with it its bail piece 17, is moved upward until the bail clears the pivoted member 22, when said member drops forward (from left to right in Figs. 2 and 3) from the position shown in Figs. 2 and 9 to the position shown in Figs. 3 and 10. Thereupon the piston 11' is moved outward (from right to left in Figs. 2 and 11), permitting the container and with it the bail 17 to descend. When the bail comes in contact with the upper inclined face 22" of the member 22 (see Fig. 10), it acts to cam the entire hook 18 and its supporting bar 18' backward away from the bail so that the bail descends without being re-engaged by the hook.

All the upward movements of the container or bottom door are effected by the introduction of fluid from any suitable source, under pressure into the cylinder 12, to the left hand side of the piston, (Fig. 11), but all the downward movements of the door or container are due solely to the weight of the door or container, with or without its contained load. This is due to a valve-controlled by pass 12' extending from end to end of the cylinder around the piston. When the container is elevated and freed from the hook it is caused to descend by opening the by-pass valve 12" and permitting the fluid in the cylinder to flow from the left to the right (Fig. 11) side of the piston. The valve is controlled by a rod 12''' leading to the driver's seat. It will thus be seen that all these movements are controlled by the driver from his seat solely by operation of the by-pass valve and control of the pressure fluid to the cylinder.

The screw 21 on the arm 19 is adjusted so that by contact with the rod 20 the hook will be in exactly the right position for engaging the bail and supporting the container.

Figure 4:
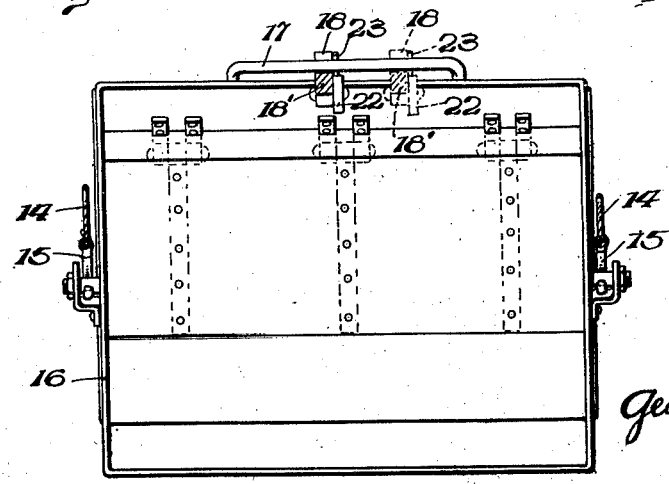
Fig. 4 is a top plan view of the bucket shown in Fig. 1.

It will be noted that by having the bail 17 extend longitudinally of the container, even though the latter swings somewhat from side to side, the hook will always be in position to engage the bail, as is illustrated by the two positions shown in Fig. 4.

By the construction herein shown, the operator is enabled to raise the container to the point where it is engaged by the automatic hook, simply by controlling the operation of the piston in the cylinder 12. Being engaged by the automatic hook, the container may be transported to any desired point of delivery and may be dumped by the operator by simply controlling the piston in the cylinder 12. The container being dumped, the operator can close the bottom of the container by operating the piston in the cylinder 12 and, having transported the empty container to the point where it is to be reloaded, the operator can lower the container to the ground, this lowering being effected also by controlling the movements of the piston in the cylinder 12 through the valve-controlled by-pass. Having been lowered, the hooks 15 may be released from the container and the same left to be reloaded, as in a quarry, and the vehicle can pick up another loaded container and proceed as before.

Having thus described the invention, what is claimed is:

1. The combination of a vehicle, an upwardly extending track or way thereon, a container adapted to travel up and down on said track or way, a rod extending across said track or way near the upper end thereof and with its ends projecting outward beyond the sides of said track or way, sheaves on said projecting ends and turning thereon as an axis, a revoluble shaft approximately vertically beneath said rod and with its ends projecting laterally beyond said track or way, a drum fixed on said shaft intermediate the sides of said track or way, two drums one fixed on each of the projecting ends of said shaft, cables wound on said two drums and passing over said sheaves, means connecting the ends of said cables to said container, a cylinder, piston and piston rod on said vehicle forward of said shaft, a sheave on the projecting end of said piston rod, a cable wound on said first mentioned drum and passing around the sheave on said piston rod and having one end secured to a part of the structure, and a source of fluid under pressure for said cylinder.

2. The combination of a vehicle, an upwardly extending track or way thereon and a container adapted to travel on said track or way, a rod extending across said track or way near the upper end thereof with its ends projecting outward beyond the sides of said track or way, sheaves turning on said projecting ends as an axis, a shaft approximately vertically under said rod and extending across said track or way and with its ends projecting laterally beyond said track or way, drums fast on the outwardly projecting ends of said shaft, cables wound on said drums and passing over said sheaves, means connecting said cables to the container, and power means for revolving said shaft.

3. The combination of a vehicle, a track or way mounted on the rear thereof and inclined upwardly and forwardly thereon, a container adapted to travel along said track or way and having limited lateral movement thereon, power means for moving said container up said track or way, a catch pivoted at a point above said container and forward of the upward path of movement thereof, a member on the container extending in a line transverse to the upward path of said container and above its center of gravity, means normally holding said catch in the upward path of movement of said member, and means in the downward path of movement of said member from a point above said catch and shifting said catch out of the path of said member.

4. The combination of a vehicle, a track or way mounted on the rear thereof and inclined upwardly and forwardly thereon, a container adapted to travel along said track or way and having limited lateral movement thereon, power means for moving said container up said track or way, a catch pivoted at a point above said container and forward of the upward path of movement thereof, a member on the container extending in a line transverse to the upward path of said container and above its center of gravity, means normally holding said catch in the upward path of movement of said member, and means on said catch and in the downward path of movement of said member from a point above said catch and shifting said catch out of the path of said member.

5. The combination of a vehicle, an upwardly and forwardly inclined track or way on the rear thereof, a container suspended to move up and down said track or way, a bail secured to said container and extending transverse to the up and down movement of said container, a swinging arm pivoted at a point above and in front of said container, a catch on the lower end of said swinging arm, means normally holding said catch in the line of movement of said bail, a cam on said catch in the upward line of movement of the bail, whereby the catch is swung out of said line, and a cam on said catch in the downward line of movement of the bail from a point above the catch, whereby the catch is swung out of the path of the bail on such downward movement.

6. The combination of a vehicle, upwardly extending bars constituting a track or way, braces extending upwardly to a point between the upper ends of the track bars, a rod extending across said track or way and passing through said track bars and braces, with its ends projecting outward beyond the sides of said track or way, sheaves on said projecting ends outside of said track or way and turning on said projecting ends as an axis, a container of greater width than said track or way and adapted to travel up and down thereon, flexible means passing over said sheaves and connected to the said container, and a power device actuating said flexible means.

GEORGE R. DEMPSTER.